(12) United States Patent
Okada et al.

(10) Patent No.: US 12,397,374 B2
(45) Date of Patent: Aug. 26, 2025

(54) SURFACE TREATMENT METHOD, MANUFACTURING METHOD FOR PRODUCT, SURFACE TREATMENT APPARATUS, AND PRODUCT

(71) Applicant: CANON KABUSHIKI KAISHA, Tokyo (JP)

(72) Inventors: Kouga Okada, Tokyo (JP); Tomonao Nakayasu, Kanagawa (JP); Toshimitsu Nagoya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 377 days.

(21) Appl. No.: 17/813,719

(22) Filed: Jul. 20, 2022

(65) Prior Publication Data
US 2023/0034269 A1   Feb. 2, 2023

(30) Foreign Application Priority Data

Jul. 30, 2021  (JP) ................. 2021-125834
Jun. 30, 2022  (JP) ................. 2022-105973

(51) Int. Cl.
*B23K 26/364*   (2014.01)
*B23K 26/0622*  (2014.01)
*B23K 26/082*   (2014.01)
*B29C 33/38*    (2006.01)

(52) U.S. Cl.
CPC ........ *B23K 26/364* (2015.10); *B23K 26/0622* (2015.10); *B23K 26/082* (2015.10); *B29C 33/3842* (2013.01)

(58) Field of Classification Search
CPC ............. B23K 26/364; B23K 26/0622; B23K 26/082; B29C 33/3842
See application file for complete search history.

(56) References Cited

U.S. PATENT DOCUMENTS

| | | | | |
|---|---|---|---|---|
| 5,059,991 A * | 10/1991 | Morisawa | ............. | H04N 1/29 347/138 |
| 7,875,414 B2 | 1/2011 | Sawada et al. | | |
| 2002/0005434 A1* | 1/2002 | Murakami | ............. | G06K 19/14 235/494 |
| 2006/0138102 A1* | 6/2006 | Sawada | ............. | B23K 26/355 219/121.69 |
| 2013/0032971 A1* | 2/2013 | Omatsu | ............. | B82Y 10/00 264/293 |

FOREIGN PATENT DOCUMENTS

WO   2004/035255 A1   4/2004
WO   WO-2015163244 A1 * 10/2015 ............. B21D 22/02

* cited by examiner

*Primary Examiner* — Maria V Ewald
*Assistant Examiner* — Ethan Weydemeyer
(74) *Attorney, Agent, or Firm* — Venable LLP

(57) ABSTRACT

A product includes a fine periodic structure having a plurality of projection portions extending parallel to each other in a first direction in each of a first region and a second region adjacent in the first direction on a surface of a substrate. The fine periodic structure formed in an inner portion of the first region and the fine periodic structure formed in an inner portion of the second region are substantially the same periodic structures. End portions of the plurality of projection portions formed in the first region and end portions of the plurality of projection portions formed in the second region are formed in a boundary portion between the first region and the second region.

13 Claims, 17 Drawing Sheets

SURFACE TREATMENT METHOD, MANUFACTURING METHOD FOR PRODUCT, SURFACE TREATMENT APPARATUS, AND PRODUCT

BACKGROUND OF THE INVENTION

Field of the Invention

The present invention relates to a method of forming a fine periodic structure on the surface of a product by using laser light.

Description of the Related Art

For example, a rainbow color that is observed by holding a compact disk: CD or a digital versatile disk: DVD to the light originates from interference, diffraction, and refraction caused by a periodic structure as small as a wavelength of light, and is called a structural color. The structural color can realize directional gross that cannot be realized by printing or the like, and thus used for the purpose of decoration or forgery prevention.

It is known that the structural color can be obtained by forming a fine periodic structure (diffraction periodic structure) on the surface of a substrate by laser processing. The fine periodic structure formed by laser processing is called-laser induced periodic surface structure: LIP SS.

International Publication No. 2004/035255 discloses a method of irradiating a substrate with monoaxial laser light near a processing threshold value to scan the substrate while irradiated portions thereof overlapping, and forming a fine periodic structure in a manner similar to self-organization by ablation of a portion where incident light and scattered light along the surface of the substrate interfere with each other.

For example, in the case of using a structural color for the purpose of decoration or forgery prevention, there is a high demand for imparting the structural color to a relatively large area for improving the optical effect.

It is known that, in the case of forming the fine periodic structure (LIPSS) by laser processing to impart the structural color, the pitch of the periodic structure changes depending on the irradiation conditions such as the incident angle of the irradiation with a laser beam on the substrate. Since how the structural color is observed changes when the pitch is changed or inconsistent, to impart a highly uniform structural color, the variation of the incident angle of the laser light needs to be reduced in the region where the LIPSS is provided.

Meanwhile, to perform the laser processing at a high speed, the scan is typically performed by deflecting the laser beam by using an optical scanning mechanism such as a galvano mirror instead of mechanically and relatively moving the laser light source with respect to a processing target. If the angle by which the optical deflection scanning is performed is increased, the processing range can be increased and thus the processing can be performed at a high speed, but the variation of the incident angle depending on the position in the processing range also increases.

Therefore, a method for forming a LIPSS exhibiting a high-quality structural color in a large area on the surface of a product at a relatively high productivity has been desired.

SUMMARY OF THE INVENTION

According to a first aspect of the present invention, a surface treatment method for irradiating a substrate surface with pulse laser light includes setting a first region and a second region arranged in this order and adjacent to each other in a first direction on the substrate surface, setting a plurality of scanning paths extending in the first direction and parallel to each other in each of the first region and the second region, and after sequentially scanning each of the plurality of scanning paths set in the first region by moving an irradiation position of the pulse laser light in the first direction, sequentially scanning each of the plurality of scanning paths set in the second region by moving the irradiation position of the pulse laser light in the first direction.

According to a second aspect of the present invention, a surface treatment apparatus includes a deflection portion configured to deflect laser light output from a laser light source to perform optical scanning of the laser light, a movement mechanism configured to mechanically change a positional relationship between the deflection portion and a workpiece, and a controller configured to control the deflection portion and the movement mechanism. On a basis of a first region and a second region that are set on a surface of the workpiece, adjacent to each other, and arranged in this order in a first direction, and of a plurality of scanning paths set in each of the first region and the second region and extending in the first direction to be parallel to each other, the controller performs control such that the deflection portion moves an irradiation position of the laser light in the first direction to sequentially scan each of the plurality of scanning paths set in the first region. Then the controller performs control such that the movement mechanism changes the positional relationship between the deflection portion and the workpiece in the first direction. And then the controller performs control such that the deflection portion moves the irradiation position of the laser light in the first direction to sequentially scan each of the plurality of scanning paths set in the second region.

According to a third aspect of the present invention, a product includes a fine periodic structure having a plurality of projection portions extending parallel to each other in a first direction in each of a first region and a second region adjacent in the first direction on a surface of a substrate. The fine periodic structure formed in an inner portion of the first region and the fine periodic structure formed in an inner portion of the second region are substantially the same periodic structures. End portions of the plurality of projection portions formed in the first region and end portions of the plurality of projection portions formed in the second region are formed in a boundary portion between the first region and the second region. A shape of the projection portion at each end portion of the plurality of projection portions formed in the first region is different from a shape of the projection portions in the inner portion of the first region, and a shape of the projection portion at each end portion of the plurality of projection portions formed in the second region is different from a shape of the projection portions in the inner portion of the second region.

Further features of the present invention will become apparent from the following description of exemplary embodiments with reference to the attached drawings.

DESCRIPTION OF THE EMBODIMENTS

Figure 1:
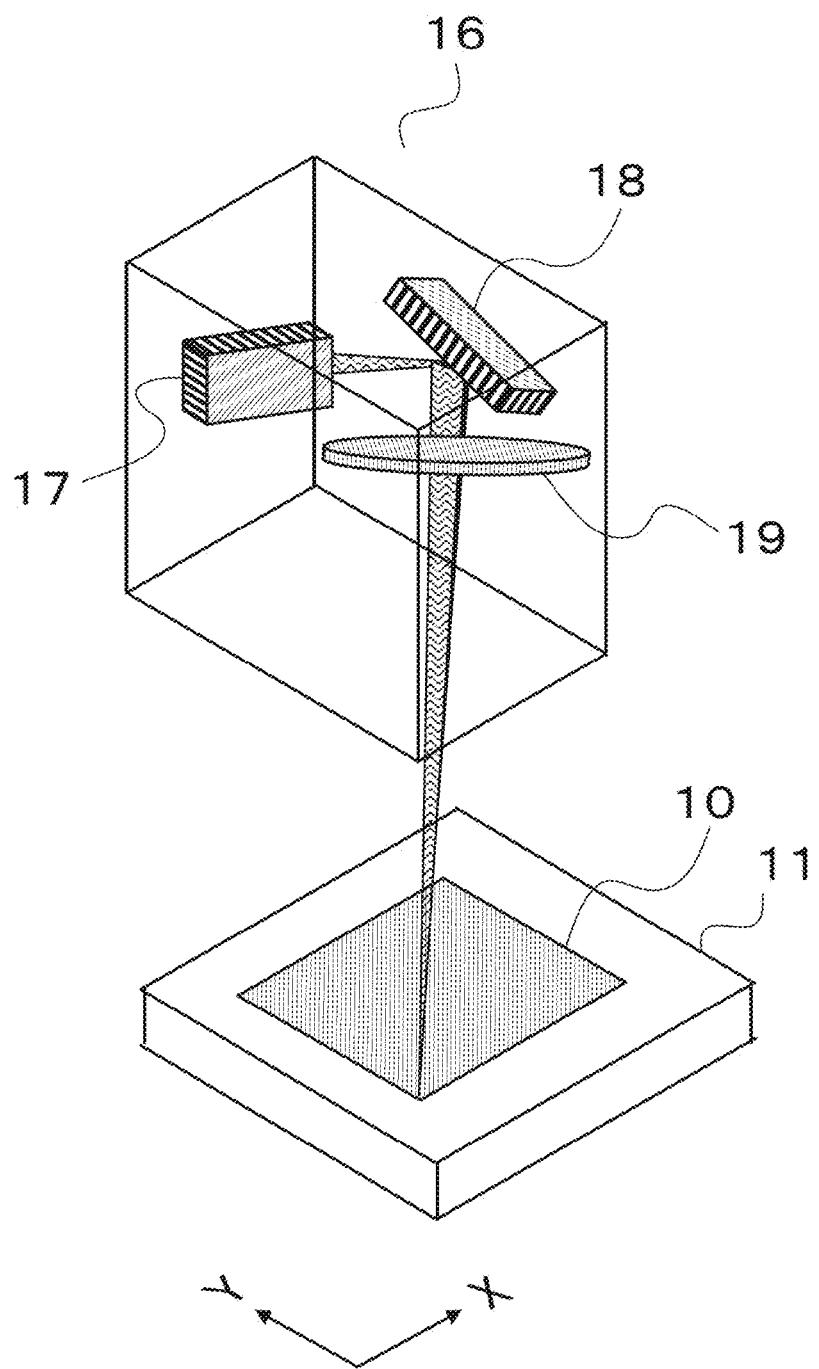
FIG. 1 is a schematic diagram illustrating a laser head portion of a laser processing apparatus according to an embodiment.

A surface treatment method, a surface treatment apparatus, and the like serving as embodiments of the present invention will be described with reference to drawings. The embodiments and examples shown below are merely examples, and for example, the detailed configuration can be appropriately modified by one skilled in the art for implementation within the scope of the present invention.

To be noted, in the drawings referred to in the description of the embodiments and examples described below, it is assumed that elements denoted by the same reference numerals have substantially the same functions unless otherwise described.

In addition, in the description below, for example, a +X direction indicates the same direction as the direction pointed by an X-axis arrow in the illustrated coordinate system, and a −X direction indicates a direction that is complete opposite to the direction pointed by the X-axis arrow in the illustrated coordinate system. In addition, just an X direction without+ or − indicates a direction parallel to the X axis, and whether the direction is the same or not as the direction pointed by the illustrated X axis arrow does not matter. The same applies to directions other than (±)X directions.

Laser Processing Apparatus

FIG. 1 is a schematic diagram illustrating a laser head portion included in a laser processing apparatus used for forming a LIPSS. Laser light output from a laser oscillator 17 included in the laser head 16 is reflected in a predetermined direction by a galvano mirror 18 serving as a deflection portion, then passes through a condensing lens 19 to form a beam, and irradiates a processing target 11 serving as a workpiece. At this time, by moving the galvano mirror 18, the irradiation position of the laser light on the processing target 11 can be two-dimensionally changed for scanning. A region or range where processing can be performed by deflection scanning of the laser beam using an optical scanning means such as the galvano mirror 18 is denoted by 10 in the drawings. This region will be referred to as a patch. The size of the patch 10 may be set to match the limit of the movable range of the galvano mirror 18. However, in this case, the difference in the incident angle of the laser beam is too large between a center portion and a peripheral portion of the processing target 11, and there is a possibility that the structural color exhibited by formation of the LIPS S also becomes uneven to an extent that is aesthetically not allowable. Therefore, the size of the patch 10 is preferably set to such a value that the unevenness of the structural color in the patch is within an allowable range even if the size is smaller than a mechanical movable limit.

In the case where the area where the LIPSS should be formed on the processing target 11 serving as a workpiece is too large to be covered by one patch 10, the entirety of the processing target region is covered by setting a plurality of adjacent patches. The size of the patch 10 is preferably set such that the difference in the incident angle of the laser light is not too large near a boundary between adjacent patches and the difference in the structural color does not exceed a visually allowable range.

To be noted, the mechanism (deflection portion) that performs optical deflection scanning of the laser beam is not limited to this example, and for example, a mechanism such as a polygon mirror that continuously performs one-directional deflection at a high speed may be used.

Figure 2:
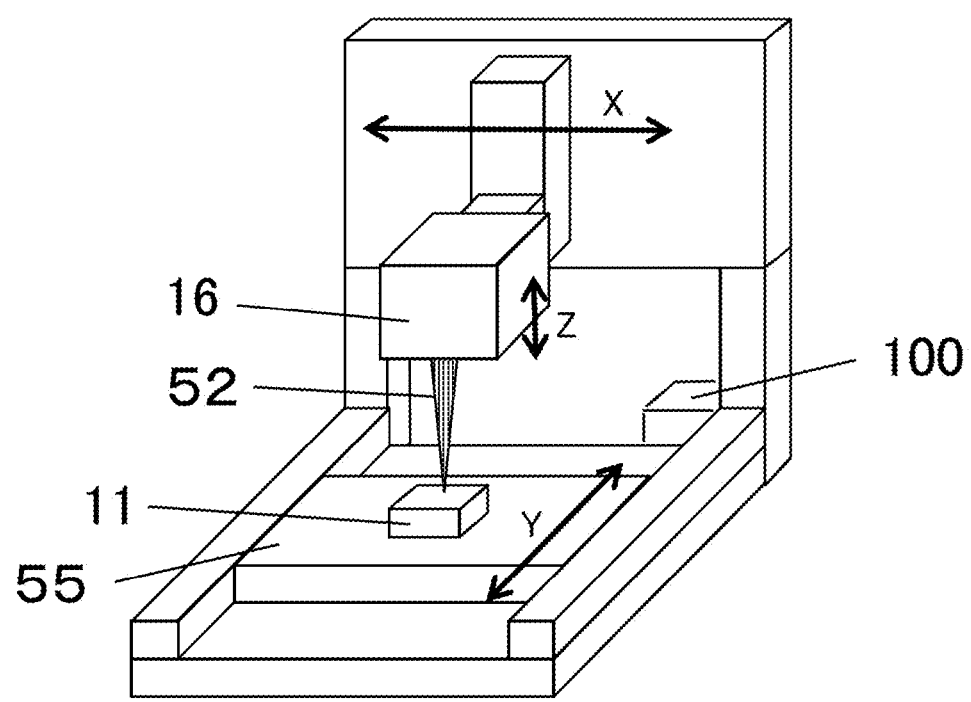
FIG. 2 is a schematic diagram illustrating a configuration of the laser processing apparatus according to the embodiment.

FIG. 2 is a schematic diagram illustrating a configuration of the laser processing apparatus including the laser head 16 described above. The laser processing apparatus 51 includes the laser head 16 capable of radiating laser light 52 for processing, and a processing stage 55 on which the processing target 11 can be placed. In addition, the laser processing apparatus 51 includes an X-axis movement mechanism, a Y-axis movement mechanism, and a Z-axis movement mechanism such that the positional relationship between the laser head 16 and the processing target 11 can be changed. The laser head 16, the X-axis movement mechanism, the Y-axis movement mechanism, and the Z-axis movement mechanism are controlled by a controller 100.

The controller 100 is a computer that controls the operation of each part of the laser processing apparatus 51, and includes a central processing unit: CPU, a memory, an input/output controller: I/O controller, and so forth. The controller 100 may further include an input device such as a keyboard or a mouse, and an output device such as a display. The memory in the controller 100 stores a control program for forming a periodic structure (fine periodic structure (nano periodic structure)) having fine recesses and projections, and information related to settings of the patch and of the scanning method. This information may be input by a user via the input device, input from an external computer or a storage device through a network via the I/O controller, or input by attaching a portable memory such as a universal serial bus: USB memory.

In addition, the laser processing apparatus 51 includes an unillustrated ¼ wavelength plate for adjusting the polarization direction of the laser light irradiating the processing target 11 serving as a workpiece, and the ¼ wavelength plate is rotatably held about an optical axis between the condensing lens 19 and the processing target 11. In the present embodiment, the polarization direction of the laser light irradiating the processing target 11 can be adjusted to be perpendicular to a direction of a scanning line SC (X direction) that will be described later, by adjusting the angle of the ¼ wavelength plate in the rotation direction. As a result of this adjustment, a LIPSS structure having a good shape in which the longitudinal direction of each groove is aligned along the direction of the scanning line SC can be formed, and thus a high-quality structural color can be imparted to the surface of the processing target 11.

The laser light output from the laser head 16 is focused on an irradiation position on the processing target 11. To be noted, unillustrated optical elements for adjusting the shape and convergence of the beam may be further provided between the laser head 16 and the processing target 11. As a method for controlling the irradiation energy density of the laser to be close to a processing threshold value of the processing target 11, the positional relationship may be adjusted such that the light irradiates the processing target 11 on an off-focus position which is deviated from the focus position by a certain distance.

As has been described above, the laser head 16 includes a two-axis galvano scanner and an fθ lens, and the irradiation position can be quickly moved by driving the galvano mirror 18. The scan by the galvano mirror 18 can be performed at a higher speed than stage driving by the X-axis movement mechanism and the Y-axis movement mechanism, and therefore, scan in each patch is performed by using the galvano mirror 18, and the patches are switched by moving the stage by the movement mechanisms.

As a laser light source for laser processing, a pulse laser that repetitively performs radiation of a short pulse can be preferably used. Various lasers such as pulse lasers of picoseconds and nanoseconds like CO2 laser and YAG laser can be used, and for example, a titanium sapphire laser can be preferably used. The titanium sapphire laser is a so-called femto second laser that is an ultrashort pulse, and for example, the output specifications thereof are a pulse width of 120 fs, a center wavelength of 800 nm, a repetition frequency of 1 kHz, an energy per pulse of 0.25 µJ to 400 µJ.

Laser Scanning Method in One Patch

Figure 3:
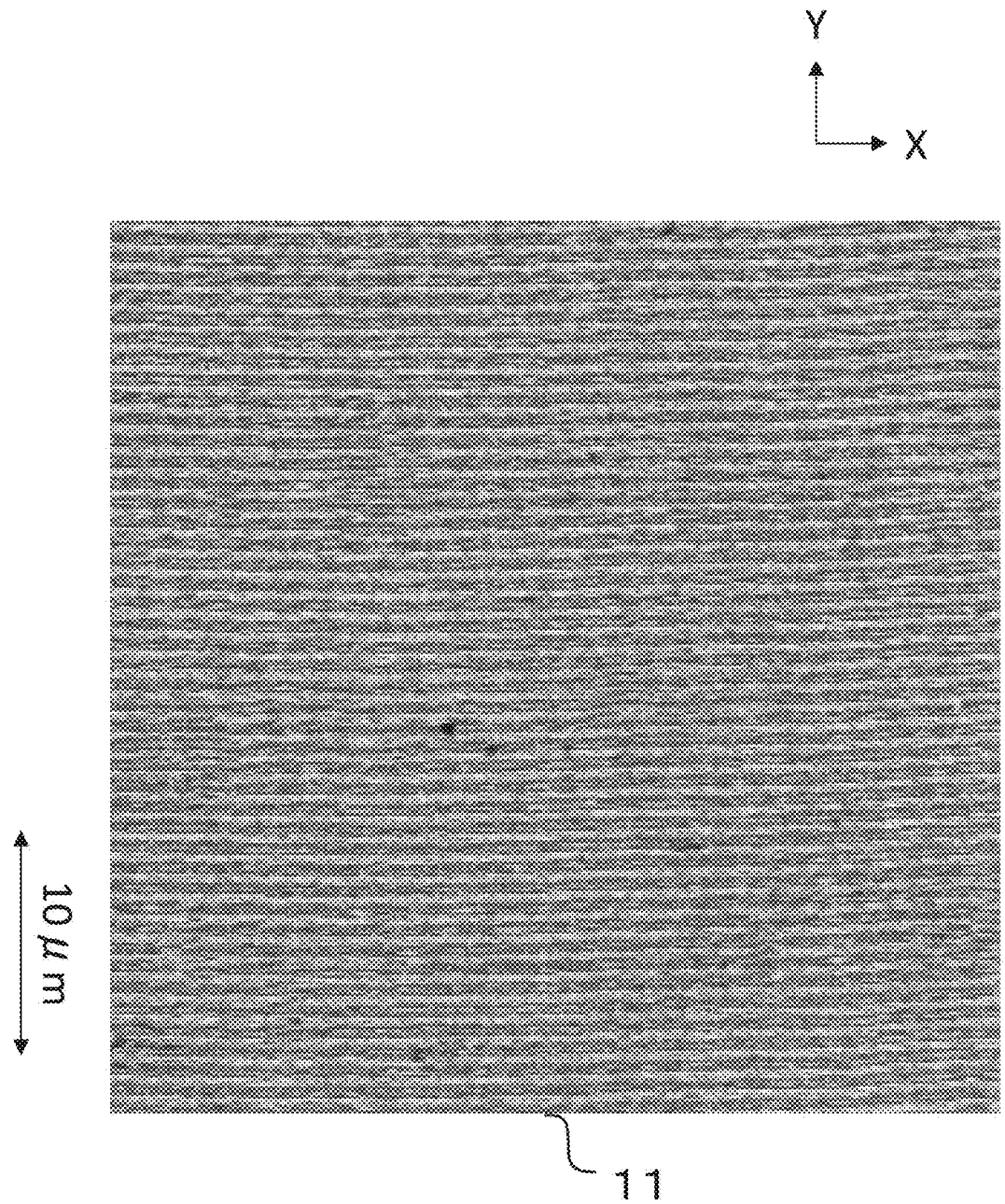
FIG. 3 is an enlarged photograph of a fine periodic structure in plan view.
Figure 4:
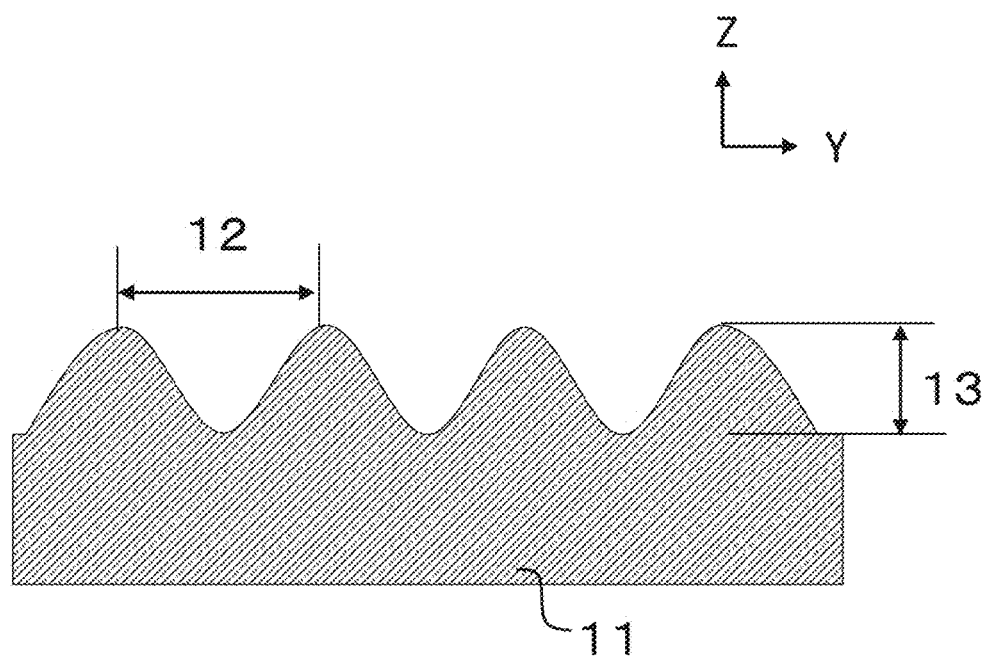
FIG. 4 is a diagram schematically illustrating a cross-section of the fine periodic structure taken along a Y direction.

FIG. 3 illustrates an enlarged photograph of a periodic structure (fine periodic structure) according to the present embodiment in plan view, and it can be seen that a structure in which a large number of fine grooves are arranged parallel to the X direction serving as a first direction at a predetermined pitch on the surface of the processing target 11 serving as a workpiece in plan view is present. FIG. 4 is a diagram schematically illustrating a cross-section of the fine periodic structure taken along the Y direction serving as a second direction. The fine grooves or fine projection portions are arranged in the Y direction at a pitch indicated by 12, and the fine grooves or fine projection portions have a depth or height indicated by 13. Typically, the LIPSS has a pitch 12 of about 1 µm, and a depth (or height) 13 of about 0.5 µm to 0.7 µm.

To form fine grooves extending in the X direction in a patch, scan is performed by moving the pulse laser light in the X direction serving as a first direction while irradiating the processing target 11 with the pulse laser light at a predetermined repetition frequency such that irradiation regions of the pulses partially overlap. The polarization direction of the laser light irradiating the processing target 11 is adjusted to be perpendicular to the direction of the scanning line SC that will be described later, that is, the X direction. The repetition frequency, scanning speed, irradiation beam diameter, and the like of the pulse laser light are adjusted to conditions preferable for forming the LIPSS, that is, the irradiation energy density on the substrate is adjusted to a value near the processing threshold value. By performing the irradiation at an appropriate energy density, the fine periodic structure is formed in a manner similar to self-organization by ablation in a portion where the incident light and scattered light along the surface of the substrate interfere with each other. By radiating the laser light along one scanning line, a fine periodic structure constituted by a plurality of fine grooves or fine projection portions along the scanning line can be formed.

To arrange fine grooves extending in the X direction in an area of a certain width in the Y direction, the scan by the laser light needs to be performed a plurality of times in the X direction. To perform the laser scanning in the X direction, there is a method of moving the irradiation position in the +X direction in time series, and a method of moving the irradiation position in the −X direction in time series.

Figure 5A:
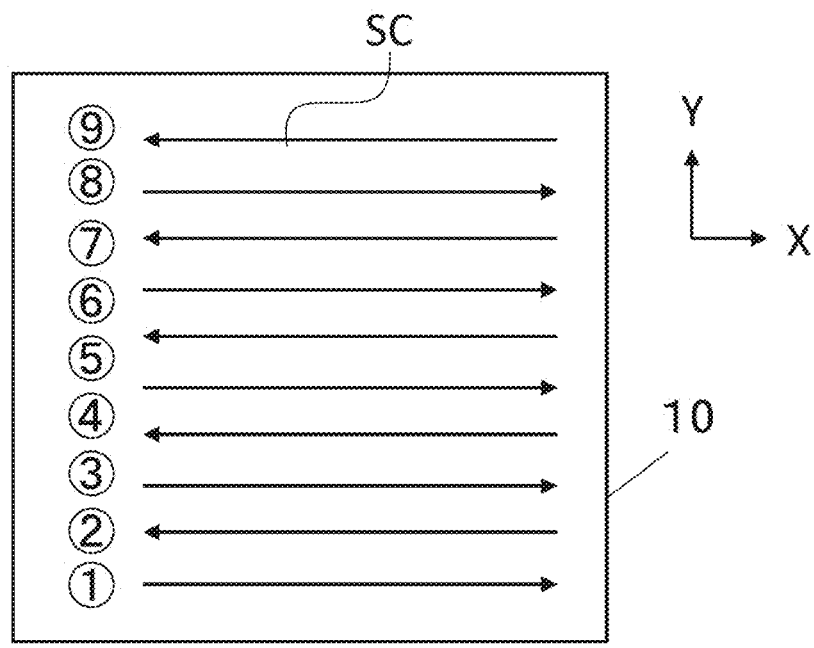
FIG. 5A is a schematic diagram for describing a scanning method for reference.
Figure 6A:
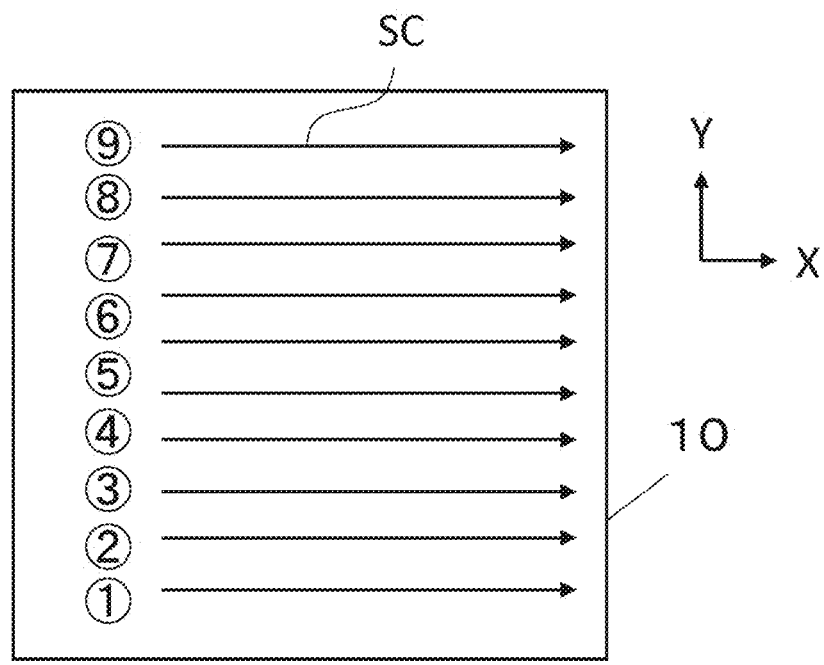
FIG. 6A is a schematic diagram for describing a scanning method according to the embodiment.

FIGS. 5A and 6A are schematic diagrams for describing two methods for laser scanning, and for the sake of simplification of the description, a case where nine scanning lines are set in the patch 10 to form a large number of fine grooves is assumed herein. The patch 10 is illustrated in plan view, nine scanning lines SC serving as scanning paths scanned by the laser light are indicated by 1 to 9 in accordance with the scanning order, and the direction in which the irradiation position is moved is indicated by an arrow for each scanning line SC.

Figure 5B:
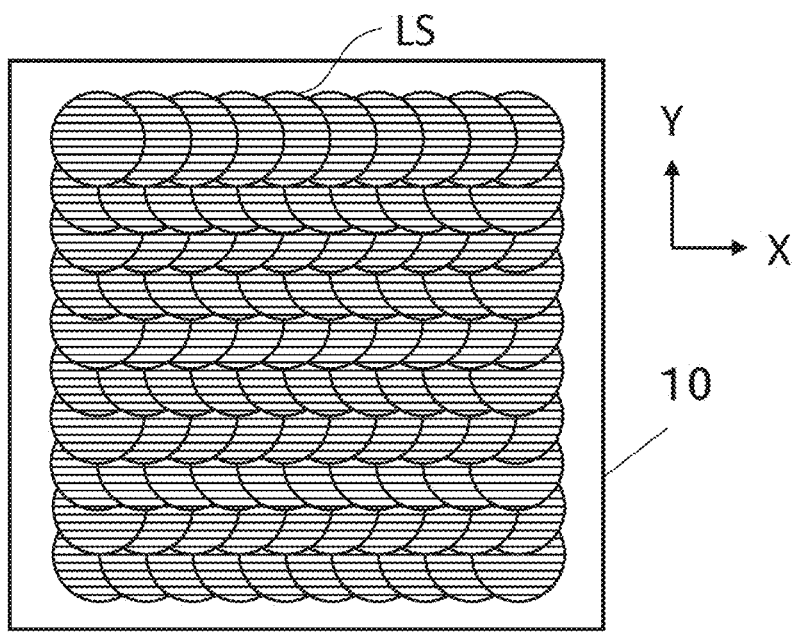
FIG. 5B is a plan view schematically illustrating an irradiation history of a laser pulse by the scanning method for reference.
Figure 6B:
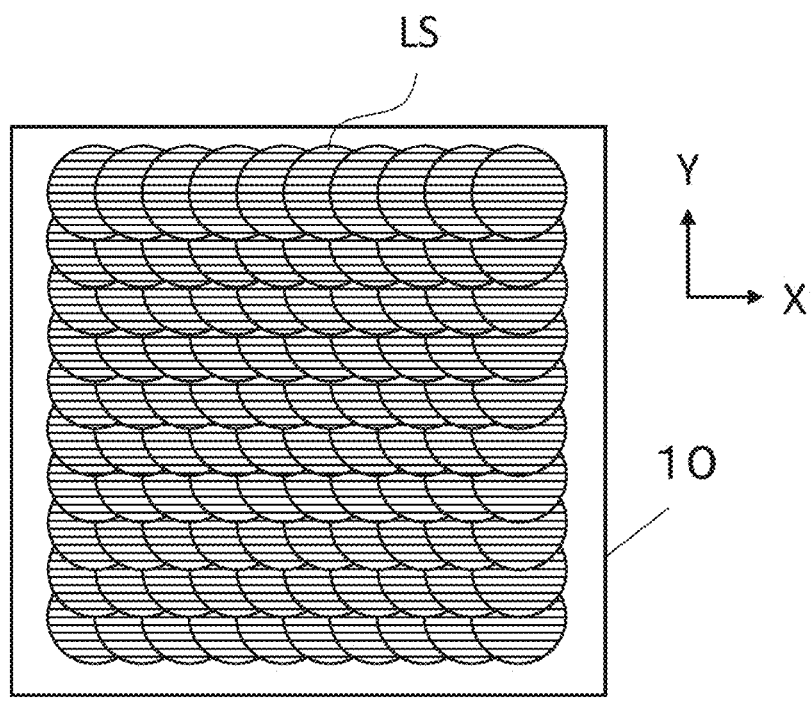
FIG. 6B is a plan view schematically illustrating an irradiation history of a laser pulse by the scanning method according to the embodiment.

In addition, FIGS. 5B and 6B are respectively plan views schematically illustrating irradiation histories of the cases where irradiation of the laser pulse is performed by the scanning methods of FIGS. 5A and 6A. The shape of the irradiation spot LS of the pulse laser light is typically illustrated as a circular shape, but newer irradiation spots are overdrawn on older irradiation spots in time series. Therefore, in a portion to which an older pulse and a newer pulse are radiated in an overlapping manner, the irradiation shape of the older pulse is covered from the view by the irradiation shape of the newer pulse.

As illustrated in FIG. 5A, if so-called raster scan in which the scan is sequentially performed along the scanning lines 1 to 9 while alternately switching the beam movement direction between the +X direction and the −X direction is employed, the galvano scanner does not have to be returned to the same starting point in the X direction for each scanning line. Therefore, the time required for processing can be shortened. In contrast, in the case where the scan is performed by moving the beam in the +X direction in all the scanning lines 1 to 9 as illustrated in FIG. 6A, the irradiation position needs to be returned to the starting point in the X direction each time the scanning line serving as a scanning path is switched, and therefore the time required for the processing is longer than in FIG. 5A.

Here, looking at the pulse irradiation history, it can be seen that, as obvious from comparison between FIGS. 5B and 6B, whereas the pattern of overlap of the irradiation spots LS is not uniform in the patch 10 in the former case, the pattern of overlap of the irradiation spots LS is more uniform in the patch 10 in the latter case. As described above, the LIPS S is a fine periodic structure that is formed in a manner similar to self-organization by ablation of a portion where incident light and scattered light along the surface of the substrate interfere with each other by radiating laser light at an intensity near the processing threshold value to perform the scan while overlapping the irradiation portions. Therefore, if how the irradiation spots LS overlap is not uniform, a structural color that has high quality in terms of external appearance thereof cannot be imparted to the patch 10 substantially uniformly.

Therefore, in the present embodiment, the laser scanning is performed such that the direction in which the irradiation spot moves is the same for all the scanning lines in each patch as illustrated in FIG. 6A.

Further, in the case of setting a plurality of patches and forming a fine periodic structure in each patch, the directions of the scanning lines are set to be parallel between the plurality of patches such that the structural color is not different between patches. Further, the scan is performed such that the direction in which the irradiation spot moves is the same in all scanning lines in all patches and substantially the same structural color is imparted to all the patches.

A procedure for setting a plurality of patches and forming fine periodic structures to impart a structural color to a region of a relatively large area on the outer surface of the processing target will be described below.

First Embodiment

Figure 7A:
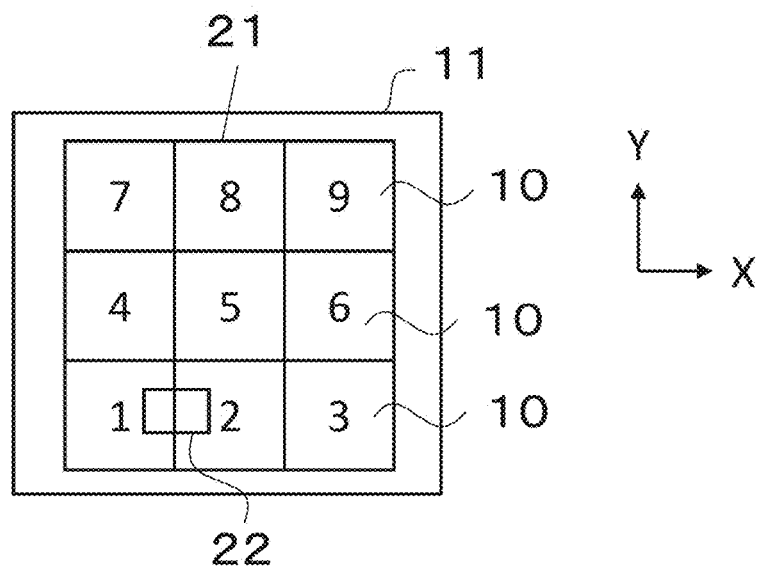
FIG. 7A is a schematic plan view for describing a procedure for forming a fine periodic structure by setting a plurality of patches in a first embodiment.

FIG. 7A is a schematic plan view for describing a procedure for forming a fine periodic structure to impart a structural color to a region of a relatively large area on the outer surface of the processing target. In the present embodiment, a structural color is imparted to a region 21 on the outer surface of the processing target 11 serving as a workpiece. The region 21 has a size that cannot be covered by a single patch, and therefore in the present embodiment, nine square patches 10 are set and arranged adjacent to each other in a 3×3 matrix shape. To be noted, the shape of the patches 10 may be a rectangular shape whose sides do not have equal length instead of the square shape.

In any of the patches 10, the scanning lines SC (not illustrated) of the laser light are set parallel to the X direction as described with reference to FIG. 6A, and the scan by the laser light is performed such that the irradiation spot moves in the +X direction serving as a first direction in every scanning line SC.

Then, in the present embodiment, the nine patches are sequentially selected and irradiated with laser light to form the LIPS S in the order of the numbers shown in the patches in FIG. 7A. When the patches arranged in the horizontal direction (X direction) in the matrix arrangement are referred to as a row, and the patches arranged in the vertical direction (Y direction) are referred to as a column, patches arranged in one row are sequentially processed, and patches in another row adjacent to the previous row are then sequentially processed.

The order in which the scanning lines are selected in each patch follows the Y direction as illustrated in FIG. 6A. The direction in which the row of patches selected in the matrix arrangement of the patches changes is the Y direction, which is the same as the direction in which the scanning line selected in each patch changes.

For example, in the lowermost row, the patches are processed in the order of numbers 1, 2, and 3 shown in the drawing, then the process transitions to a row adjacent thereto in the +Y direction, and patches are processed in the order of numbers 4, 5, and 6. In the present embodiment, as illustrated in the drawings, a configuration in which adjacent patches are processed in the order of +X direction serving as a first direction in every row of the matrix is employed. That is, the direction of the processing order of the patches, that is, the +X direction coincides with the direction in which the irradiation spot moves in each scanning line serving as a scanning path, that is, the +X direction.

To be noted, in the relationship with the claims, for example, the patch whose scanning order is 1 in FIG. 7A may be referred to as a first region, the patch whose scanning order is 2 may be referred to as a second region, and the patch whose scanning order is 4 may be referred to as a third region. At this time, among two sides of the first region parallel to the X direction, a side in contact with the third region may be referred to as a first side, and among two sides of the third region parallel to the X direction, a side in contact with the first region may be referred to as a second side.

Figure 8A:
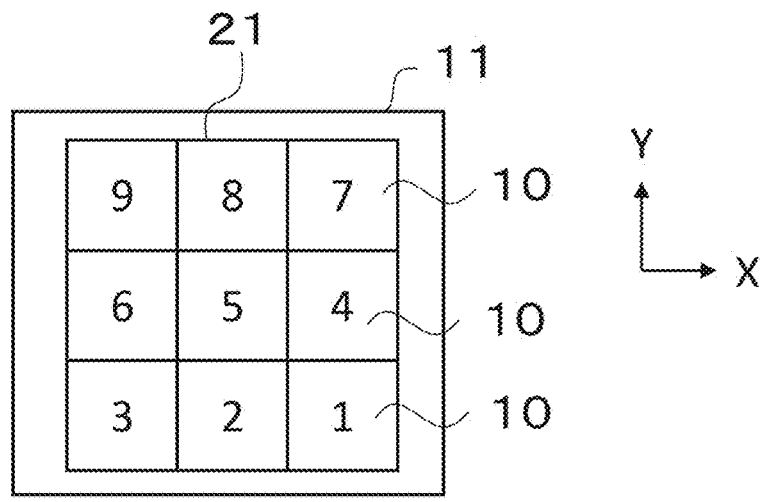
FIG. 8A is a schematic plan view for describing a procedure for forming a fine periodic structure by setting a plurality of patches in a reference embodiment.

Here, for comparison, a reference embodiment in which the processing order of the patches is set by a different method from the embodiment will be described with reference to FIG. 8A. In the reference embodiment illustrated in FIG. 8A, nine square patches 10 are arranged adjacent to each other in a 3×3 matrix shape similarly to the embodiment, and the nine patches are sequentially selected and irradiated with laser light to form the LIPSS in the order of the numbers shown in the patches. In the present reference embodiment, as illustrated in the drawings, a configuration in which adjacent patches are processed in the order of −X direction in every row is employed. That is, the direction of the processing order of the patches, that is, the −X direction is opposite to the direction in which the irradiation spot moves in each scanning line, that is, the +X direction.

Figure 7B:
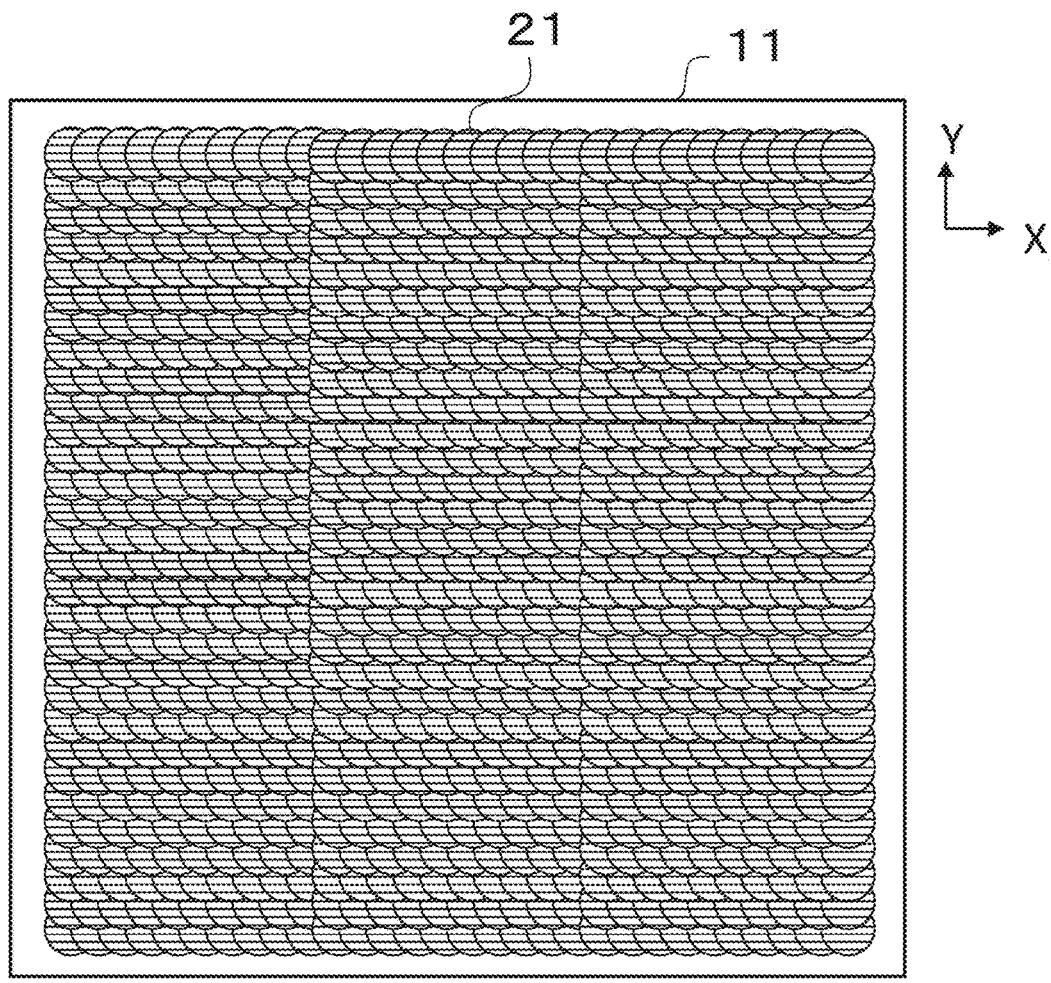
FIG. 7B is a plan view schematically illustrating an irradiation history of a laser pulse in the first embodiment.
Figure 8B:
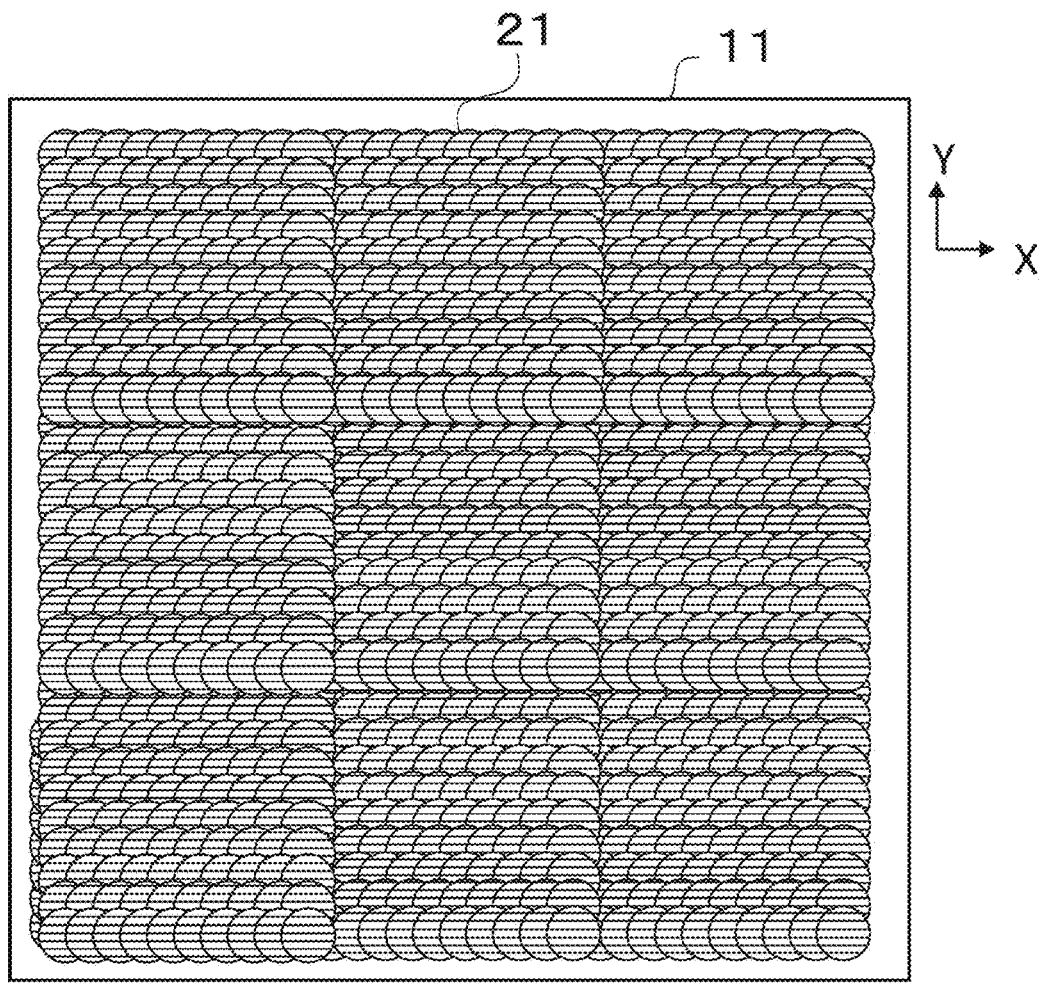
FIG. 8B is a plan view schematically illustrating an irradiation history of a laser pulse in the reference embodiment.

FIG. 7B is a plan view schematically illustrating an irradiation history of the laser pulse in accordance with the scanning method of the embodiment illustrated in FIG. 7A. FIG. 8B is a plan view schematically illustrating an irradiation history of the laser pulse in accordance with the scanning method of the reference embodiment illustrated in FIG. 8A. Similarly to FIGS. 5B and 6B that have been already described, newer irradiation spots are overdrawn on older irradiation spots in time series. Therefore, in a portion to which an older pulse and a newer pulse are radiated in an overlapping manner, the irradiation shape of the older pulse is covered from the view by the irradiation shape of the newer pulse.

As obvious from comparison between FIGS. 7B and 8B, whereas the pattern of overlap of the irradiation spots LS at the boundary between patches, that is, at an end portion of the scanning line is more irregular in the latter case than in the former case. The LIPSS is a fine periodic structure that is formed in a manner similar to self-organization by ablation of a portion where incident light and scattered light along the surface of the substrate interfere with each other by radiating laser light at an intensity near the processing threshold value to perform the scan while overlapping the irradiation portions. Therefore, if there is a portion where the regularity of how the irradiation spots LS overlap is different from the surroundings thereof, the fine structure therein is substantially different from the surroundings thereof, and thus the structural color appears differently from the structural color of the surroundings thereof. That is, a structural color having excellent quality in terms of external appearance thereof cannot be formed uniformly in the region 21.

Specifically, in the case of the reference embodiment illustrated in FIG. 8B, it can be seen that the regularity of how the irradiation spots overlap is greatly different in the boundaries between patches arranged in the X direction and boundaries between patches arranged in the Y direction as compared with the surroundings thereof. Therefore, when the region 21 where the LIPSS is formed is visually recognized, horizontal and vertical lines corresponding to the boundaries between patches can be seen in a lattice shape in the rainbow structural color.

Figure 9:
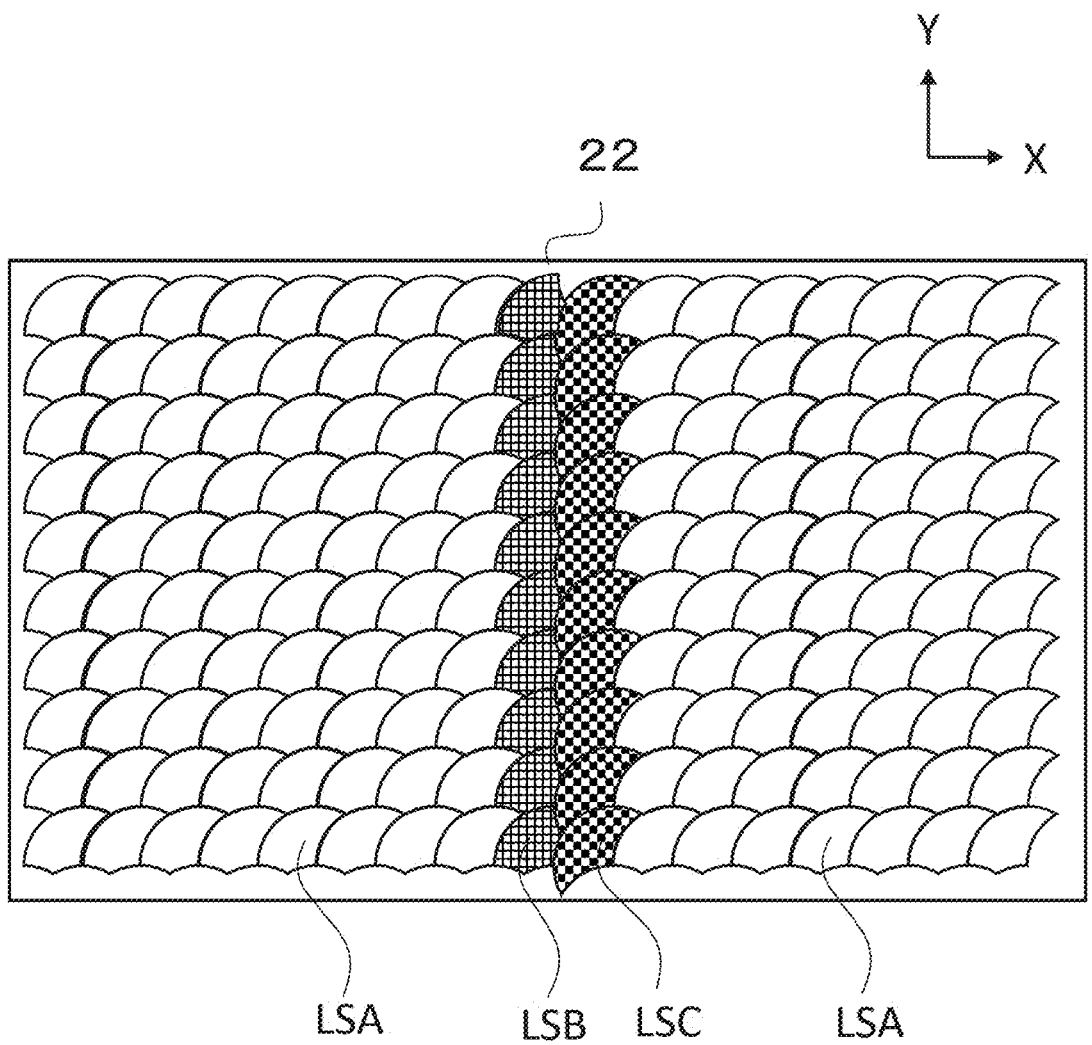
FIG. 9 is an enlarged view of a small region illustrated in FIG. 7A, schematically illustrating how irradiation spots overlap (pattern of overlap).

In contrast, in the embodiment illustrated in FIG. 7B, the regularity of how the irradiation spots overlap is not disturbed at the boundaries between patches arranged in the Y direction serving as a second direction, that is, at the boundaries parallel to the X direction serving as a first direction. In addition, at the boundaries between patches arranged in the X direction, that is, at the boundaries parallel to the Y direction, although the regularity of how the irradiation spots overlap is slightly different from that of the surroundings thereof, the disturbance of the regularity is smaller than in the reference embodiment. FIG. 9 is an enlarged view of a small region 22 illustrated in FIG. 7A schematically illustrating the pattern of how the irradiation spots overlap. While irradiation spot shapes schematically indicated by LSA are regularly arranged in most part of the region in each patch, irradiation spot shapes denoted by LSB and LSC are illustrated at the boundaries between patches arranged in the X direction, that is, at end portions of patches in the X direction. To be noted, the end portions of the patches in the X direction correspond to starting points and finishing points of laser irradiation along the scanning lines.

LSB and LSC are slightly different patterns from LSA, but the disturbance of how the irradiation spots overlap at the boundaries between the patches is smaller than in the reference embodiment illustrated in FIG. 8B. That is, substantially the same periodic structure is formed at a portion schematically indicated by overlap of LSA, and a portion having a slightly different shape is present in the part indicated by LSB and LSC, but the difference therebetween is small.

As can be seen from what has been described above, whereas the lattice-like lines are noticeable in the region where the structural color is exhibited in the reference embodiment, according to the present embodiment, the boundaries between patches arranged in the Y direction are visually hardly recognizable, and boundaries between patches arranged in the X direction do not stand out. Therefore, in the case of imparting a structural color to a region of a large area by setting a plurality of patches and forming the LIPSS, the vertical lines among the boundaries between the patches are hardly noticeable, and a highly uniform structural color can be imparted to the entirety of the region.

In a first embodiment, the LIPSS is formed on the basis of the following conditions (1) to (5).

(1) A plurality of square or rectangular patches are set and arranged in a matrix shape.

(2) The plurality of scanning lines are set parallel to the X direction in every patch.

(3) The scan by the laser light is performed such that the direction in which the irradiation spot moves is the +X direction in every scanning line. The direction of the order in which the scanning lines irradiated with the laser light are selected in each patch is set to the +Y direction.

(4) When the patches arranged in the horizontal direction (X direction) in the matrix arrangement are referred to as a row, and the patches arranged in the vertical direction (Y direction) are referred to as a column, patches arranged in one row are sequentially processed, and patches in another row are then sequentially processed (row-based sequential processing). When the laser processing transitions from one row to another row, the transition occurs from the one row to another row adjacent thereto in the +Y direction. That is, the direction of the order of selection of the scanning lines irradiated with the laser light in each patch is set to the same direction as the direction of the processing order of patch rows in the matrix, that is, the +Y direction.

(5) In each row, adjacent patches are processed in the order following the +X direction. That is, the direction in which the patches are processed in each row is set to the same direction as the direction in which the irradiation spot moves in each scanning line, that is, the +X direction.

According to the present embodiment, a fine structure (LIPSS) that exhibits a high-quality structural color can be formed in a large area at a relatively high productivity. That is, a method and a manufacturing apparatus for manufacturing a product having an excellent structural color can be provided.

The method for forming the LIPSS according to the present embodiment can be implemented in an embodiment in which the surface of a product is directly subjected to laser processing (surface treatment) to impart the structural color to the product. Further, the method can be also implemented in an embodiment in which not the product is directly subjected to laser processing but a molding surface of a mold used for manufacturing the product is subjected to surface treatment by laser processing. That is, the method can be also implemented in an embodiment in which a fine periodic structure for imparting the structural color to the product is formed on the molding surface of the mold by laser processing. In the fine periodic structure on the molding surface, the recesses and projections are reversed from the fine periodic structure formed on the product. If the shape of the molding surface of the mold is transferred onto a molding material such as a resin material by using the mold having undergone the surface treatment, a high-quality structural color in which the boundaries of the patches for formation of the LIPSS on the molding surface do not stand out can be imparted to the molded product such as a molded resin product.

The LIPSS according to the present embodiment can be formed on various products such as anti-forgery stickers and parts for various printers such as cartridges for printers, drum covers for printers, and exterior parts for printers. That is, a high-quality structural color can be imparted to the substrate surface of these products.

Second Embodiment

As a second embodiment, a method of performing laser processing by setting patches of different shapes from the first embodiment when forming the LIPS S will be described. To be noted, in the description of the second embodiment, the same elements as in the description of the first embodiment will be simplified or omitted.

In the first embodiment, the LIPSS is formed in accordance with the conditions (1) to (5) described above. In the second embodiment, the condition (1) is different from the first embodiment, and the conditions (2) to (5) are substantially the same as in the first embodiment.

Figure 10A:
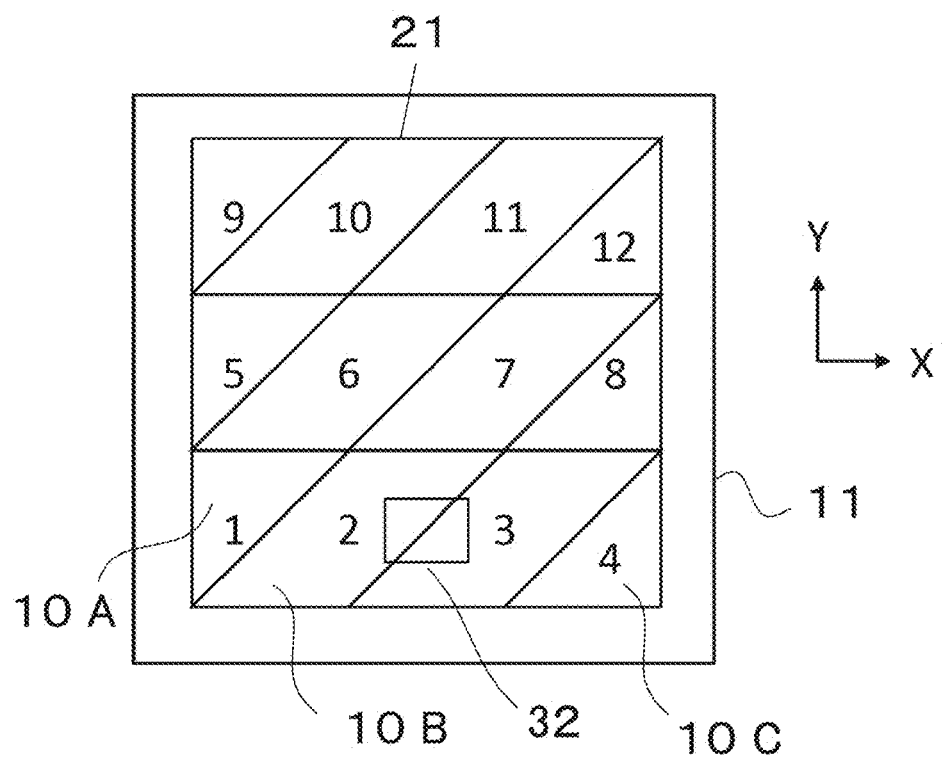
FIG. 10A is a schematic plan view for describing a procedure for forming a fine periodic structure by setting a plurality of patches in a second embodiment.
Figure 11A:
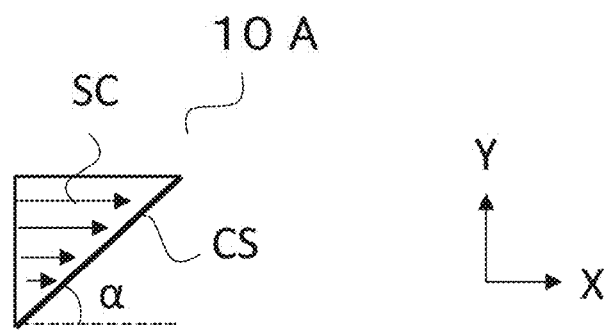
FIG. 11A is a diagram illustrating the shape of a patch according to the second embodiment.
Figure 11B:
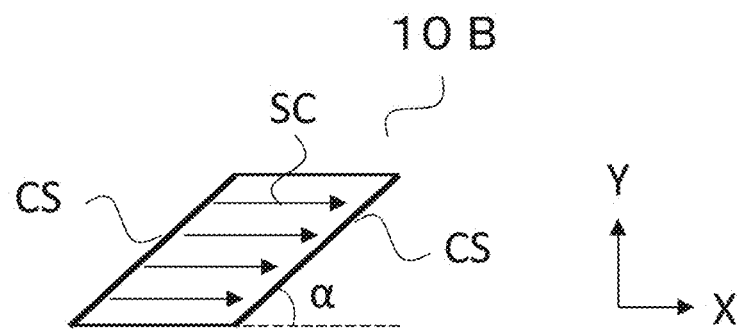
FIG. 11B is a diagram illustrating the shape of another patch according to the second embodiment.
Figure 11C:
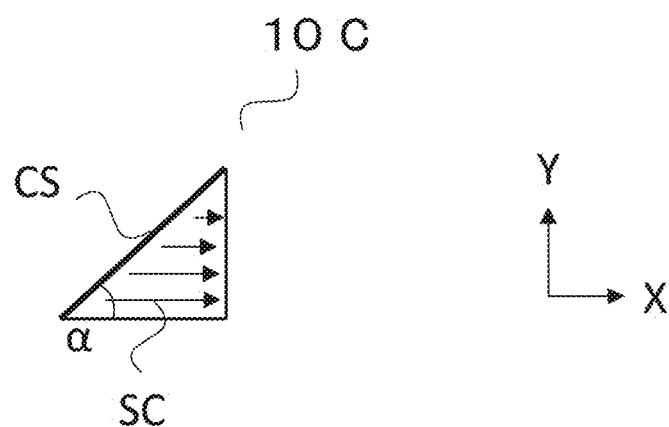
FIG. 11C is a diagram illustrating the shape of yet another patch according to the second embodiment.

FIG. 10A is a schematic plan view for describing a procedure for setting a plurality of patches and forming a fine periodic structure in each patch when imparting a structural color to a region of a relatively large area on the outer surface of the processing target in the second embodiment. In the present embodiment, the structural color is imparted to the region 21 on the outer surface of the processing target 11. In the present embodiment, patches 10A, 10B, and 10C having three kinds of shapes are set, and are arranged adjacent to each other in a 4×3 matrix shape to cover the region 21. FIGS. 11A to 11C are respectively schematic plan views for describing the patches 10A, 10B, and 10C.

As illustrated in FIGS. 11A to 11C, in each patch, the scanning lines SC of the laser light are set parallel to the X direction as described in the condition (2). Further, the scanning of the laser light is performed such that the direction in which the irradiation spot moves is the +X direction in every scanning line SC. In addition, the order in which the scanning lines irradiated with the laser light in each patch follows the +Y direction similarly to FIG. 6A of the first embodiment.

In addition, in FIGS. 11A to 11C, a side where patches adjacent in the X direction serving as a row direction in FIG. 10A are in contact with each other is indicated by a thick line as a side CS. In the first embodiment, the side where patches adjacent in the X direction serving as a row direction are in contact with each other is perpendicular to the X direction serving as a row direction. In contrast, in the present embodiment, the side CS is not perpendicular to the X direction serving as a row direction but intersects with the X direction obliquely, that is, at an angle different from 90°. The acute angle, that is, the smaller angle at the intersection is indicated by α in the drawing.

Figure 10B:
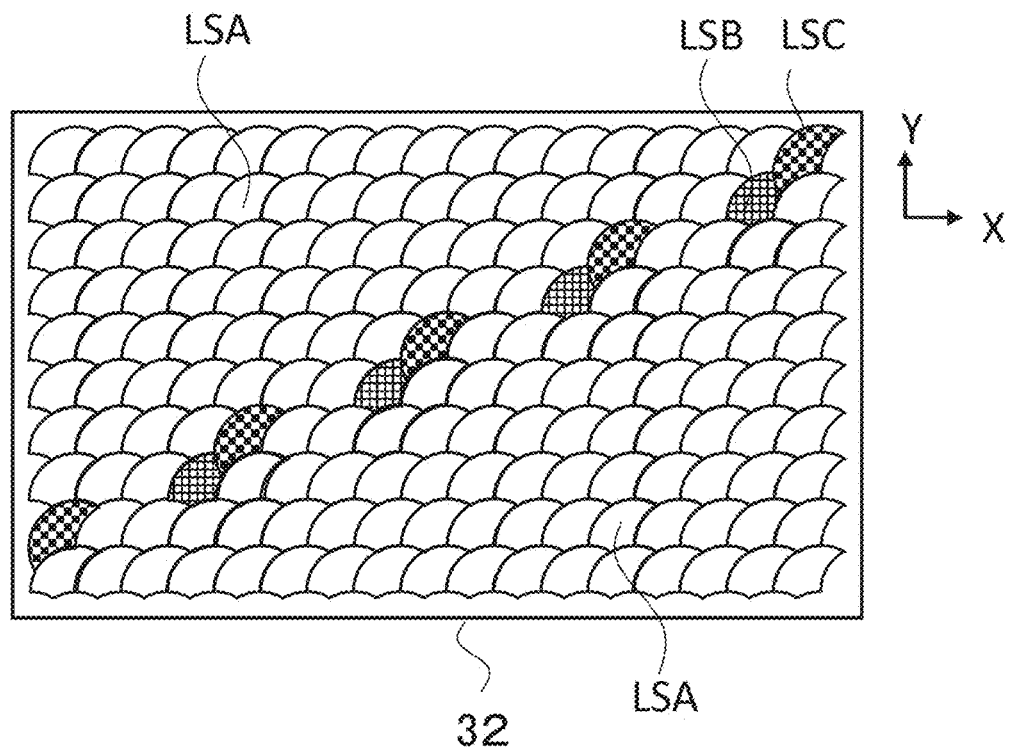
FIG. 10B is a plan view schematically illustrating an irradiation history of a laser pulse in the second embodiment.

FIG. 10B is an enlarged view of a small region 32 illustrated in FIG. 10A schematically illustrating the pattern of how the irradiation spots overlap. While irradiation spot shapes schematically indicated by LSA are regularly arranged in most part of the region in each patch, irradiation spot shapes denoted by LSB and LSC are illustrated at the boundaries between patches arranged in the X direction, that is, at end portions of patches in the X direction. To be noted, the end portions of the patches in the X direction correspond to starting points and finishing points of laser irradiation along the scanning lines.

LSB and LSC are slightly different patterns from LSA, and it can be seen that LSB and LSC are obliquely arranged along the side CS in the present embodiment, and the arrangement density thereof is lower than that of the first embodiment illustrated in FIG. 9. That is, since the arrangement density in the portion at boundaries between patches where the overlap pattern of the irradiation spots is disturbed is low, the boundaries between patches arranged in the X direction when the structural color imparted to the region 21 is observed becomes further unnoticeable than in the first embodiment.

When the intersection angle α is smaller, LSB and LSC are more dispersedly arranged in the X direction, and therefore there is a tendency that the boundaries between patches arranged in the X direction becomes more unnoticeable. Therefore, α is preferably equal to or less than 45°. However, in the case where α is smaller, the area per patch that can be subjected to optical scanning within the limited light deflection range of the laser processing apparatus is smaller. The magnitude of α is preferably set in consideration of the balance between the effect of making the boundaries between patches less noticeable in the region to which the structural color is imparted and increase in the time required for the manufacture, and is preferably appropriately set within the range of 20° to 70°.

According to the present embodiment, a fine structure (LIPSS) that exhibits a high-quality structural color can be formed in a large area at a relatively high productivity. In addition, similarly to the first embodiment, the present embodiment can be also implemented in not only the embodiment in which the surface of the product is directly subjected to laser processing to impart the structural color to the product but also in an embodiment in which a molding surface of a mold used for manufacturing the product is subjected to surface treatment by laser processing. If the shape of the molding surface of the mold is transferred onto a molding material such as a resin material by using the mold subjected to the surface treatment, a structural color can be imparted to the molded resin product such that the boundaries between patches used when performing laser processing on the molding surface of the mold is unnoticeable.

EXAMPLE

Figure 12:
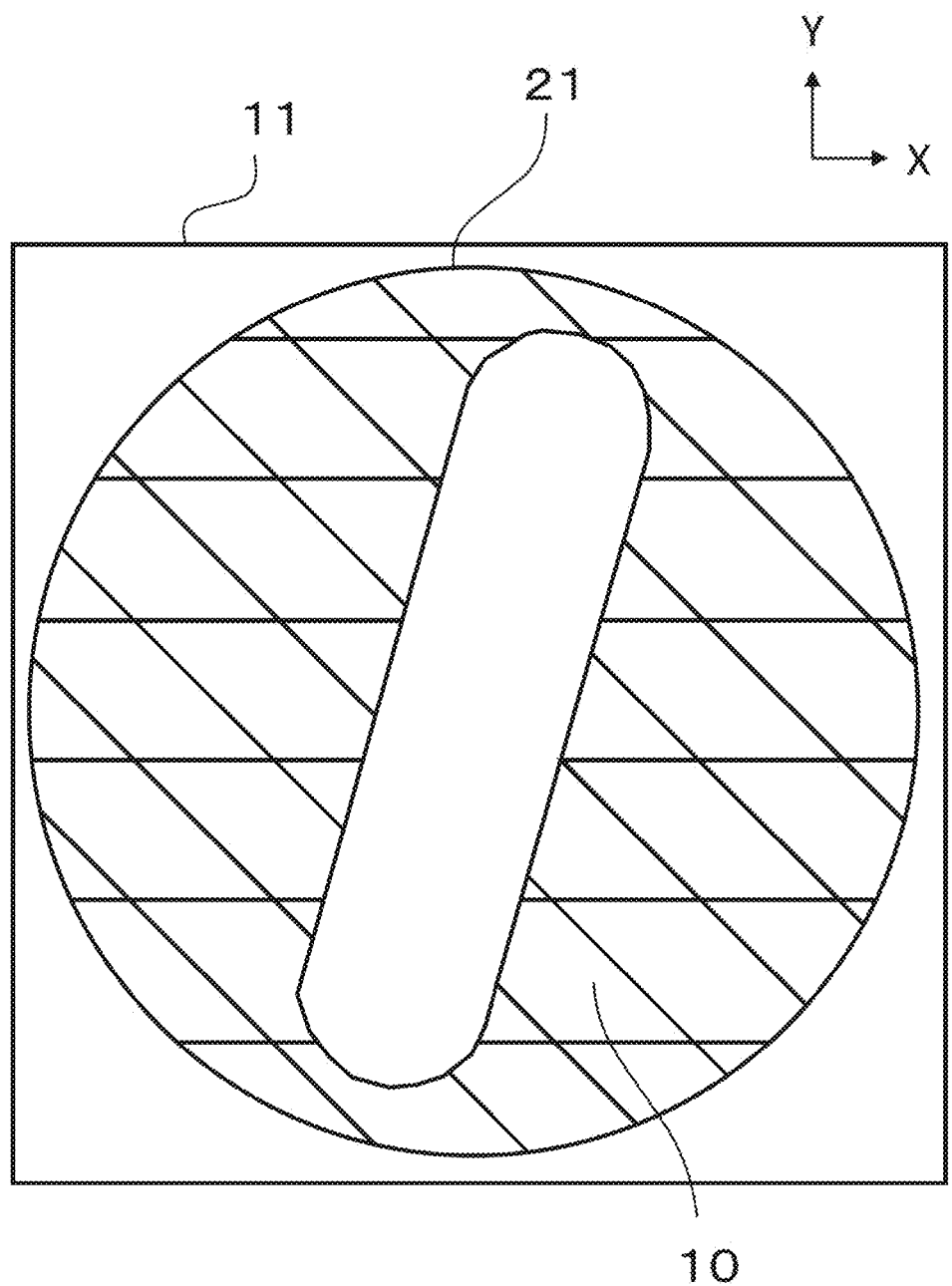
FIG. 12 is a schematic diagram illustrating a molding surface of a mold according to an example in plan view.

An example in which a LIPSS shape was formed by performing laser processing on the surface of a mold to impart a decorative effect to a molded resin product will be described. FIG. 12 is a schematic diagram illustrating a molding surface of the mold serving as the processing target 11 in plan view, and in this example, the LIPSS was formed in the region 21 having a ring shape whose outer edge had a circle shape and whose inner edge had an elongated circle shape. This drawing also illustrates lines indicating the shapes of patches set by applying the idea of the second embodiment.

As the material of the mold, STAVAX was used. As the laser processing apparatus, LP400U manufactured by GF Machining Solutions was used. As the laser light source, an ultrashort pulse laser oscillator manufactured by AMPLITUDE SYSTEMS was used. The wavelength thereof was 1030 nm. A pulse laser whose pulse energy per pulse was 7.5 µJ and whose lens had a focal length of about 170 mm was used, and the irradiation spot diameter of the laser light was set to 40 µm by adjusting the distance between the lens and the molding surface of the mold. As the laser scanning method, a galvano mirror was used, the scanning speed was set to 500 mm/s, the scan pitch was set to 5 µm, and the irradiation frequency of the short pulse laser was set to 101 kHz. The range that can be irradiated with laser light by optical scanning using the galvano mirror was set to a 40 mm×40 mm square, and the shape of each patch was set so as to be included in the square region.

The laser scanning was performed by the scanning method described in the second embodiment, and thus the LIPSS was formed in the ring-shaped region 21. The LIPSS that was formed was a periodic structure having a cross-section as schematically illustrated in FIG. 4, the pitch 12 of the fine grooves or fine projection portions was about 1 μm, and the depth or height 13 of the fine grooves or fine projection portions was in the range of 0.3 μm to 0.5 μm.

Figure 13:
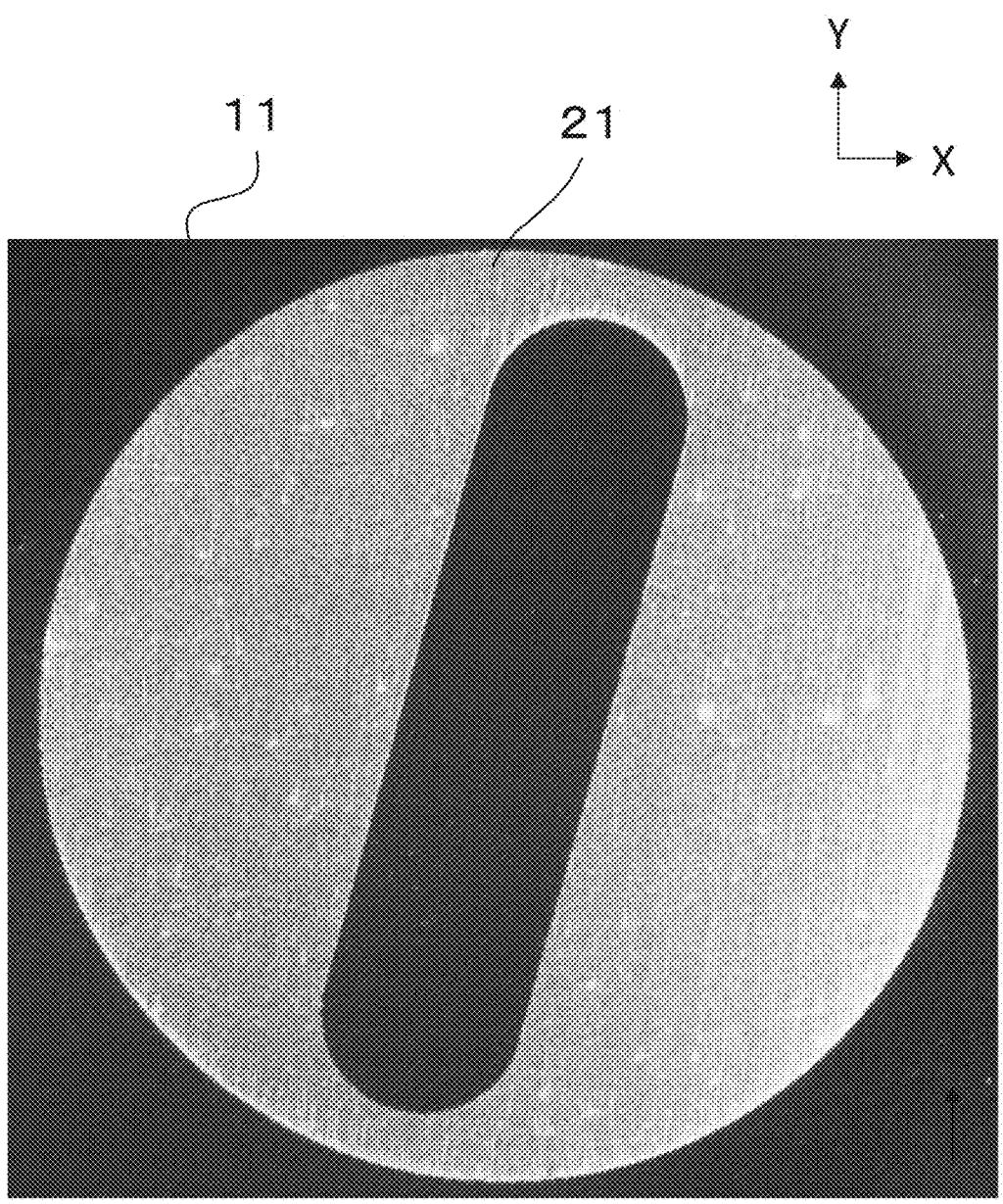
FIG. 13 is a photograph of a molding surface of the mold according to the example.

FIG. 13 is a photograph of the molding surface of the mold on which the LIPS S was formed. Although it is difficult to see in the photograph, the ring-shaped region 21 exhibits a high-quality structural color as observed by human eyes, and the boundaries between patches were visually hardly recognizable in the region 21.

A molded resin product was manufactured by injection molding using the mold. The molded resin product onto which the LIPSS on the molding surface of the mold was transferred exhibited a high-quality structural color, and the boundaries between patches set for laser processing of the mold were visually hardly recognizable for human eyes.

Figure 15:
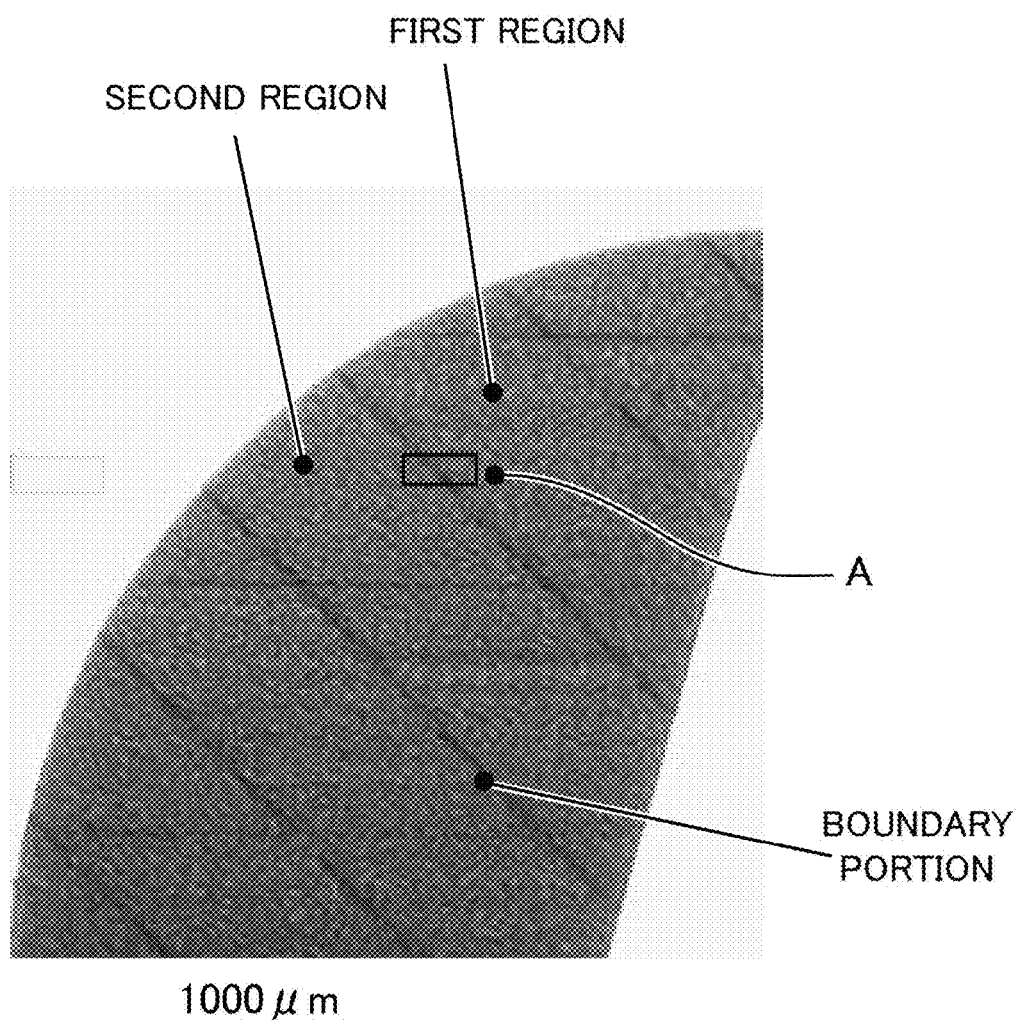
FIG. 15 is a photograph of a molded resin product onto which a LIPSS of a molding surface has been transferred as observed with a microscope.

FIG. 15 illustrates a photograph of the molded resin product onto which the LIPSS of the molding surface of the mold as observed with a microscope. Although the boundaries between the patches set for laser processing of the mold was visually hardly recognizable for human eyes, the boundaries between patches to which the LIPSS was transferred could be observed black as observed with a microscope.

Figure 16:
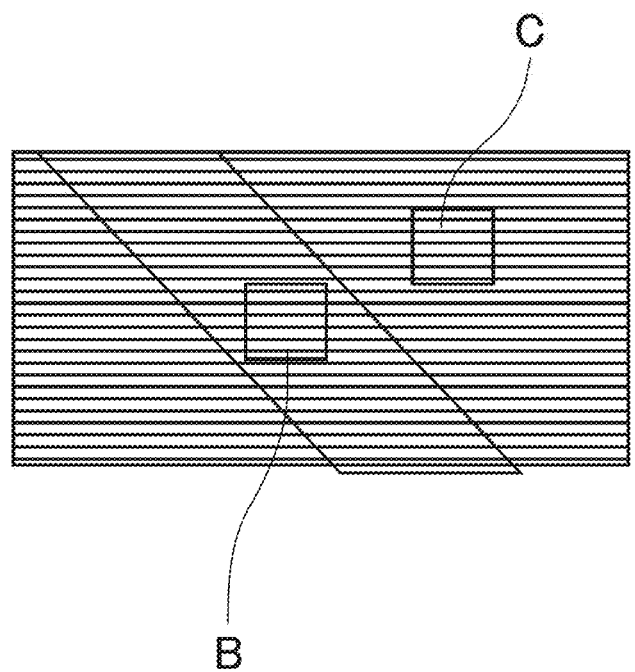
FIG. 16 is an enlarged view of a patch onto which a LIPSS has been transferred.
Figure 17:
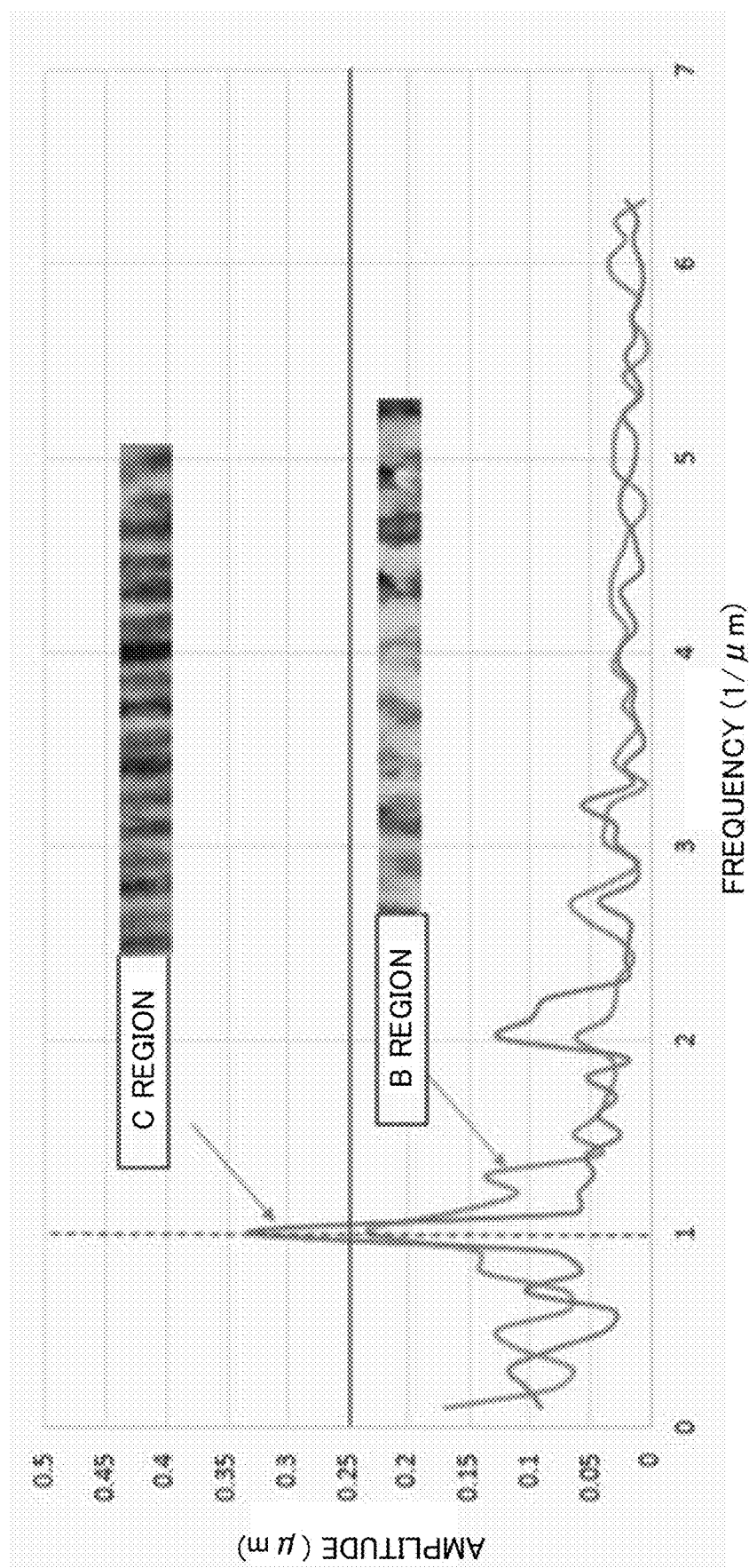
FIG. 17 is a diagram illustrating a result of FFT processing on data obtained by AFM.

FIG. 16 is an enlarged view of the patches illustrated in FIG. 15 to which the LIPSS was transferred, and is an enlarged view of an A region including a first region and a second region adjacent in the first direction and a boundary portion that is an end portion of the first region or an end portion of the second region. FIG. 17 illustrates results of atomic force microscopy: AFM observation of a B region, which is a part of the boundary portion that is an end portion of the first region or an end portion of the second region, and a C region that is a part of an inner portion of the first region. A fine periodic structure including a plurality of projection portions parallel to each other and extending in the first direction are formed in both the first region and the second region. In the B region and the C region, AFM measurement was performed at 16 positions in a direction intersecting with the first direction at a pitch of 0.078125 μm in 8 rows arranged in the first direction at a pitch of 0.078125 μm, that is, at 128 positions in total.

FIG. 17 illustrates results of fast Fourier transform: FFT of this measurement data. The value of a portion with the maximum height in the results of FFT of the data measured with an atomic force microscope: AFM is set as the height of the projection portions. It can be seen that the height of the projection portions is 0.3 μm or more in the inner portion of the first region and an inner portion of the second region, and the height of the projection portions at the boundary portion is 0.25 μm or less. That is, it is found that at the boundary portion, the periodic structure of the projection portions is disturbed and thus the height is reduced, and therefore the boundary portion is visually recognized black when observed with a microscope. It is found that the boundary portion is visually recognized by human eyes when the center line of the boundary portion that is visually recognized black, that is, a line connecting the centers in the first direction of a portion where the height of the projection portions is 0.25 μm or less, extends in the direction perpendicular to the first direction. That is, it is preferable that the center line of the boundary portion is inclined such that the angle between the center line of the boundary portion and the first direction is 20° to 70°. As a result of this, the boundary portion is visually hardly recognizable for human eyes. The shape of the patches (e.g., the first region) to which the LIPSS is transferred may be triangular or quadrangular. Alternatively, the shape may be hexagonal or polygonal. Further, the shape does not have to be a polygonal shape constituted by only straight lines, and may include a curved line.

To be noted, the present invention is not limited to the embodiments and example described above, and can be modified in many ways within the technical concept of the present invention.

Figure 14A:
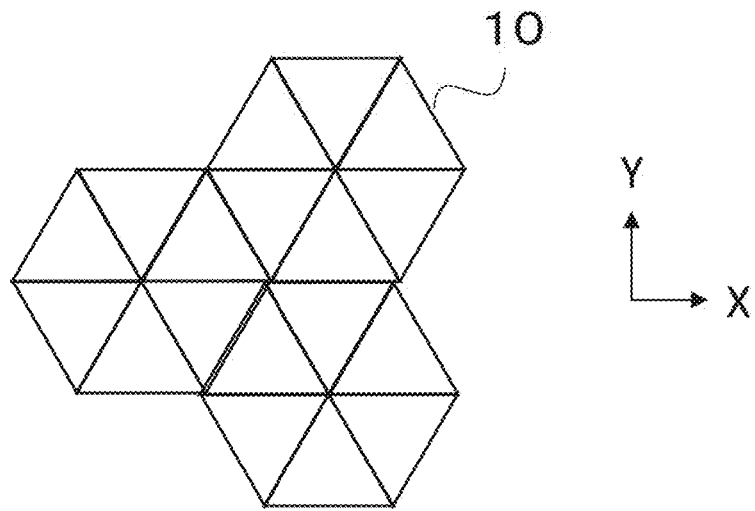
FIG. 14A is a diagram illustrating an embodiment in which only triangular patches are arranged.
Figure 14B:
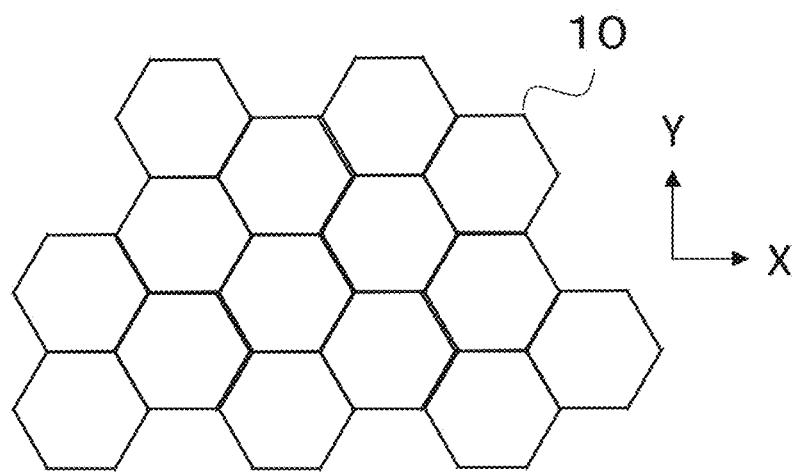
FIG. 14B is a diagram illustrating an embodiment in which only hexagonal patches are arranged.

For example, to cover the entirety of the region to be processed, a plurality of rectangular patches are disposed in the first embodiment, and triangular patches and parallelogram patches are arranged in the second embodiment, but the shape and layout of the patches are not limited to these example. For example, a configuration in which only triangular patches are arranged as illustrated in FIG. 14A may be employed, or a configuration in which hexagonal patches are used as illustrated in FIG. 14B may be employed. In addition, polygonal patches having different shapes from the examples may be arranged in the region to be processed. Further, the shape of the patches does not have to be a polygonal shape constituted by only straight lines, and a shape including a curved line intersecting with the scanning direction of the laser light may be employed.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-125834, filed Jul. 30, 2021, and 2022-105973, filed Jun. 30, 2022, which are hereby incorporated by reference herein in their entirety.

What is claimed is:
1. A product comprising:
a substrate having a periodic structure having a plurality of projection portions extending parallel to each other in a first direction in each of a first region and a second region adjacent in the first direction on a surface of the substrate,
wherein the periodic structure formed in an inner portion of the first region and the periodic structure formed in an inner portion of the second region are substantially same periodic structures,
wherein end portions of the plurality of projection portions formed in the first region and end portions of the plurality of projection portions formed in the second region are formed in a boundary portion between the first region and the second region,
wherein a shape of a projection portion at each end portion of the plurality of projection portions formed in the first region is different from a shape of the projection portions in the inner portion of the first region, and a shape of a projection portion at each end portion of the plurality of projection portions formed in the second region is different from a shape of the projection portions in the inner portion of the second region, wherein the shape of at least one of the first region and the second region is a triangular shape or a hexagonal shape, wherein the substrate is a molded resin product, and the plurality of projection portions are formed of a resin material, and wherein the periodic structure exhibits a structural color.

2. The product according to claim 1, wherein height of the projection portions in the boundary portion is 0.25 µm or less, and height of the plurality of projection portions formed in the first region is larger than the height of the projection portions in the boundary portion.

3. The product according to claim 1, wherein an angle between a center line of the boundary portion and the first direction is 20° to 70°.

4. The product according to claim 1, wherein the substrate is a substrate of an anti-forgery sticker.

5. The product according to claim 1, wherein the substrate is a part of a printer.

6. The product according to claim 1, wherein;

the first region has a first side parallel to the first direction;

the third region has a second side parallel to the first direction; and the first side and the second side are in contact with each other.

7. A method for producing the product according to claim 1, the method comprising:

setting a first processing region and a second processing region arranged in this order and adjacent to each other in an X direction on a molding surface of a mold;

setting a plurality of scanning paths extending in the X direction and parallel to each other in each of the first processing region and the second processing region; and after sequentially scanning each of the plurality of scanning paths set in the first processing region by moving an irradiation position of a pulse laser light in the X direction, sequentially scanning each of the plurality of scanning paths set in the second processing region by moving the irradiation position of the pulse laser light in the X direction.

8. The method according to claim 7, further comprising:

setting, on the surface of the substrate, a third processing region adjacent to the first processing region in a Y direction intersecting with the X direction; and setting a plurality of scanning paths extending in the X direction and parallel to each other in the third processing region, wherein in a case of scanning each of the plurality of scanning paths set in the first processing region by moving the irradiation position of the pulse laser light in the X direction, the plurality of scanning paths are selected in an order of arrangement thereof in the Y direction, and after all the plurality of scanning paths in the first processing region have been scanned, the plurality of scanning paths set in the third processing region are selected in the order of arrangement thereof in the Y direction, and scanning is performed on each selected scanning path while moving the irradiation position of the pulse laser light in the X direction, to scan all the scanning paths in the third processing region.

9. The method according to claim 7, wherein at least one of the first processing region and the second processing region has a triangular shape or a hexagonal shape.

10. The method according to claim 8, wherein;

the first processing region has a first side parallel to the X direction;

the third processing region has a second side parallel to the X direction; and the first side and the second side are in contact with each other.

11. The method according to claim 7, wherein a polarization direction of the pulse laser light irradiating the molding surface is perpendicular to the X direction.

12. The method according to claim 7 configured to impart a structural color to the molding surface.

13. The method according to claim 7, comprising forming a periodic structure on the molding surface and transferring a shape of the molding surface onto a molding material to impart a structural color to a surface of the molding material.

* * * * *